United States Patent [19]

Holmes

[11] 4,167,021

[45] Sep. 4, 1979

[54] SUPPRESSION OF CHROMINANCE SIGNAL CONTAMINATION OF THE LUMINANCE SIGNAL IN A VIDEO SIGNAL PROCESSING SYSTEM

[75] Inventor: David D. Holmes, Trenton, N.J.

[73] Assignee: RCA Corporation, New York, N.Y.

[21] Appl. No.: 859,922

[22] Filed: Dec. 12, 1977

[51] Int. Cl.² .............................................. H04N 9/535
[52] U.S. Cl. ........................................ 358/36; 358/31; 358/39
[58] Field of Search ....................... 358/26, 27, 31, 40, 358/36–38, 39, 167

[56] References Cited

U.S. PATENT DOCUMENTS

| 3,778,543 | 12/1973 | Lowry | 358/37 |
| 3,836,707 | 9/1974 | Murakami et al. | 358/31 |
| 4,030,121 | 6/1977 | Faroudja | 358/37 |

OTHER PUBLICATIONS

Barton, "A Practical Charge–Coupled Device Filter for the Separation of Luminence and Chrominance Signals...", *IEEE Trans. on Consumer Electronics*, vol. CE–23, No. 3, Aug. 1977, pp. 342–357.

Turner, "Some Thought on Using Comb Filters in the Broadcast Television Transmitter and at the Receiver", *IEEE Trans. on Consumer Electronics*, vol. CE–23, No. 3, Aug. 1977, pp. 248–257.

*Primary Examiner*—John C. Martin
*Attorney, Agent, or Firm*—Eugene M. Whitacre; William H. Meagher; Ronald H. Kurdyla

[57] ABSTRACT

Apparatus in a video signal processing system for improving the quality of a color image reproduced by a color kinescope in response to chrominance and luminance components of the video signal, the chrominance signal being subject to phase transitions likely to generate chrominance subcarrier components sufficient to contaminate the luminance signal. Chrominance signals delayed by an amount corresponding to an interval during which the phase transitions can occur are supplied to inputs of a signal multiplier, which provides an output signal indicating the presence of chrominance phase transitions. The multiplier output signal is utilized for controlling the luminance signal processing channel to suppress the sideband signals, thereby also suppressing objectionable effects of the sideband signals otherwise visible in a reproduced image.

16 Claims, 7 Drawing Figures

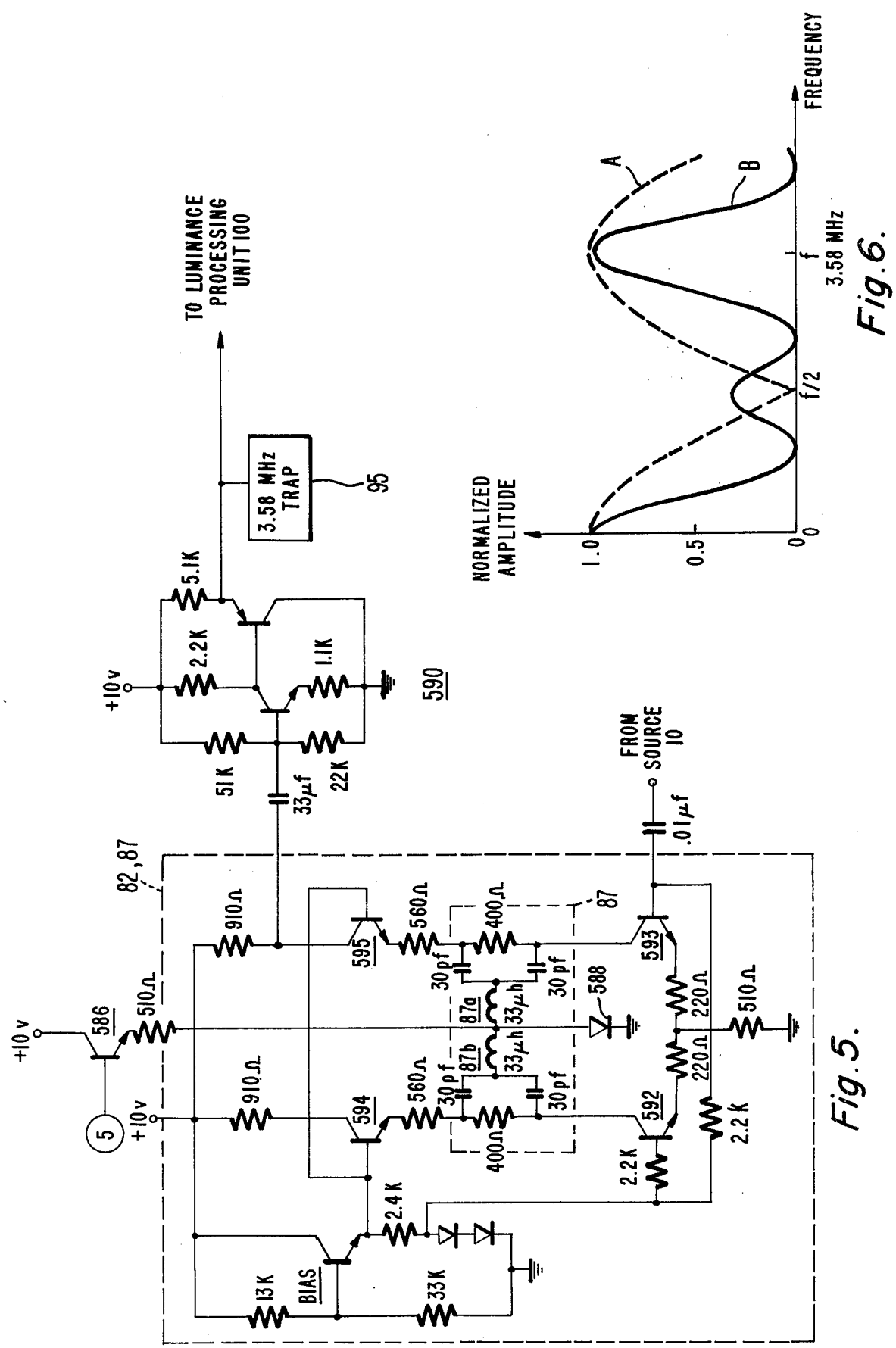

SUPPRESSION OF CHROMINANCE SIGNAL CONTAMINATION OF THE LUMINANCE SIGNAL IN A VIDEO SIGNAL PROCESSING SYSTEM

This invention relates to color video signal processing systems, and in particular, to apparatus in a color television signal processing system for suppressing chrominance signal contamination of the luminance signal caused by phase transitions of the chrominance signal.

A color image reproduced in response to an image representative video signal is primarily defined by the luminance and chrominance components of the video signal. A color television signal processing system such as a color television receiver commonly includes a chrominance channel for processing the chrominance component exclusive of the luminance component, and a luminance channel for processing the luminance component exclusive of the chrominance component.

In the design of a conventional NTSC color television receiver, the method and degree of separation of the chrominance and luminance information in the detected composite video signal have a considerable effect on the quality of the displayed picture. A standard technique in processing the luminance component of the NTSC video signal is to place an input band rejection filter or trap tuned to the color subcarrier frequency in the luminance channel to remove most of the chrominance signal frequencies, thereby preventing the chrominance signals from interfering with the signals processed by the luminance channel. Conventional chrominance circuitry is designed with a bandpass response such that luminance signal frequencies below a given frequency (e.g., 3.1 MHz) are rejected.

However, this separation technique does not represent an optimum approach to the problem of preventing or compensating for interference between the luminance and chrominance components. In particular, the chrominance trap in the luminance channel is ineffective at removing all of the color information, because its design is a compromise. The trap will have little or no rejection of signal frequencies below about 3.1 MHz. Chrominance signal frequencies (i.e., sidebands) not rejected by the trap produce interference effects on the luminance, which in turn produces edge dot interference in areas of fine detail. Failure of the trap to attenuate the entire chrominance band of frequencies results in dot-crawl on vertical edges. This undesired effect is further enhanced by the use of horizontal peaking in the luminance channel.

More specifically, the quality of a reproduced color image can be impaired due to rapid chrominance phase transitions (i.e., hue transitions) corresponding to uncorrelated (dissimilar) chrominance phase information occurring within the horizontal image scanning interval. Such transitions generate chrominance subcarrier sideband components which can contaminate the luminance signal, causing so-called "edge dots" to appear in a reproduced image. The edge dots appear at color transition regions of an image, and are especially noticeable when a color image transition recurs for several horizontal image lines within the same image frame. The dot interference then appears as edge dots appearing to move slowly upward along the (vertical) color transition region.

When transitions from one color phase (hue) to another generate sideband components of the color subcarrier that fall beyond the bandwidth rejection capability of the chrominance trap commonly included in the luminance channel, the sideband components are permitted to couple through the luminance channel and serve to modify the luminance signal such that dot interference appears on a displayed image. The interfering sideband components cause the edge dots to appear in a displayed image by modifying the amplitude of the luminance signal, which determines the contrast of the displayed image, during the transition interval.

The amount of dot interference produced is a function of the magnitude and speed of the chrominance phase transitions. Dot interference is more pronounced (i.e., more readily visible) in the case of a rapid transition between phases representative of significantly dissimilar colors (e.g., yellow phase to cyan phase), and less pronounced when the transition is less rapid and/or between phases representative of closely related colors (e.g., yellow phase to flesh tone phase), within a given horizontal image line. However, dot interference which would otherwise be less pronounced under the above circumstances can be significant when accompanied by a significant change in color saturation. It is therefore desirable to improve the quality of a reproduced color image by reducing the adverse effects attributable to uncorrelated chrominance information.

One system directed to this purpose is disclosed in my copending U.S. patent application Ser. No. 778,594, entitled "Improved Comb Filter Apparatus," a continuation-in-part of my abandoned U.S. patent application Ser. No. 678,394 and assigned to RCA Corporation. In that system, a comb filter employed to separate the frequency interleaved luminance and chrominance components of a composite color television signal is gain controlled in response to uncorrelated chrominance information in order to suppress otherwise visible effects produced by contamination of the luminance signal by the uncorrelated chrominance information.

Apparatus according to the present invention for improving the quality of a reproduced color image is included in a color television signal processing system. The system serves to control the luminance and chrominance of a reproduced color image in response to image representative luminance and chrominance components of the color television signal. The chrominance component comprises modulated color subcarrier waves exhibiting a parameter subject to transitions, with particular ones of the transitions being associated with the presence of subcarrier sideband components which may produce an undesirable disturbance of the reproduced color image if permitted to significantly affect the luminance of the reproduced image. The apparatus includes a frequency selective circuit for passing frequencies of the color television signal that are confined to a band of frequencies occupied by the chrominance component, a signal delaying network. The signal delaying network delays signals passed by the frequency selective circuit by a predetermined amount corresponding to an interval during which one of the particular transitions can occur. The apparatus also includes a circuit (e.g., a signal multiplier) responsive to delayed selectively passed signals from the output of the delay network, and to relatively undelayed selectively passed signals from the output of the frequency selective circuit, for providing an output signal indicating the occurrence of one of the particular parameter transitions. The output signal is then utilized for preventing the associated subcarrier components from significantly affecting the luminance of the reproduced color image.

In the drawing,

FIGS. 2–5 show a schematic circuit diagram of a portion of the apparatus illustrated in FIG. 1; and FIGS. 6–7 depict frequency response characteristics associated with the operation of the apparatus of FIGS. 1 and 2–5.

Figure 1:
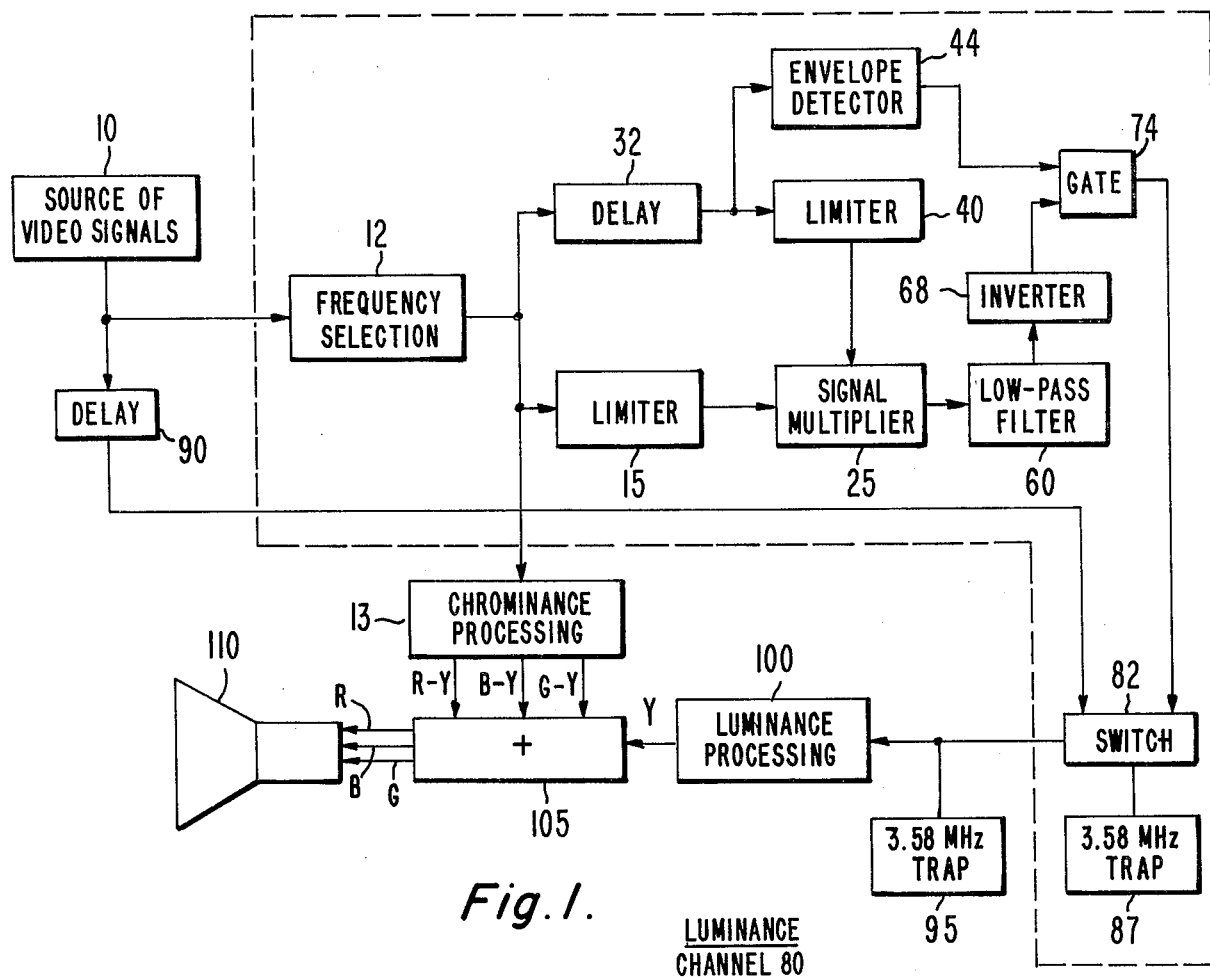
FIG. 1 illustrates in block diagram form a portion of a color television receiver including apparatus in accordance with the present invention.

The following discussion is given in the context of a television signal processing system in accordance with NTSC standards adopted by the United States. Referring to FIG. 1, a source of color video signals 10 provides a composite color television signal including chrominance and luminance components by means of conventional television signal processing circuits responsive to received radio frequency signals.

The chrominance component of the output signal from source 10 is selectively coupled via a chrominance bandpass frequency selection unit 12 to inputs of a limiter 15 and a delay unit 32, which provides a predetermined signal delay of approximately 140 nanoseconds in this example. The delayed chrominance signal from delay 32 is amplified and limited by a limiter 40, and is applied to one input of a signal multiplier 25 of the synchronous detector type. Another input of multiplier 25 receives amplified and limited undelayed chrominance signals from the output of limiter 15.

Limiters 15 and 40 serve to remove amplitude variations from the delayed and undelayed chrominance signals coupled to multiplier 25, which operates as a synchronous phase detector in this case. Multiplier 25 provides an output signal representative of the phase correlation of the chrominance signal during each image line by detecting the relative phases of the delayed and undelayed chrominance signals. The output of multiplier 25 is then low-pass filtered and inverted by units 60 and 68, respectively.

The amplitude envelope of the delayed signal is detected by unit 44 to provide an output signal indicating the presence of relatively long duration signals (i.e., chrominance signals) within the chrominance passband. The output signal from detector 44 is coupled to an input of gate 74, another input of which is supplied from the output of inverter 68. An output control signal produced by gate 74 in response to these inputs represents the simultaneous presence of relatively high chrominance saturation and change in hue (i.e., uncorrelated chrominance phase information) when chrominance signals are present. This control signal is utilized to control the operation of a switch unit 82, including signal translating and switching circuits.

Video signals from source 10 are coupled through a delay network 90 and switch 82 to a luminance signal processing unit 100 via a 3.58 MHz chrominance trap 95 commonly included in a luminance channel 80 for attenuating chrominance signal frequencies. Network 90 serves as an equalizing delay for delaying the signals from source 10 by an amount equal to the signal delay from the input of frequency selection unit 12 to the output of gate 74. Switch 82 is operatively associated with a 3.58 MHz chrominance trap or band rejection filter 87, for respectively coupling and decoupling trap 87 to and from the luminance channel when the presence or absence of uncorrelated chrominance phase information is indicated by the control signal from gate 74, as will be discussed.

Chrominance signals from the output of frequency selection unit 12 are also supplied to a chrominance signal processing unit 13 for developing R-Y, B-Y and G-Y color difference signals in known fashion. The color difference signals are combined with a luminance output signal Y from luminance processor 100 in a signal combining unit 105 for developing R, B and G color signals, which are then coupled to inputs of a color image reproducing kinescope 110.

Figure 2:
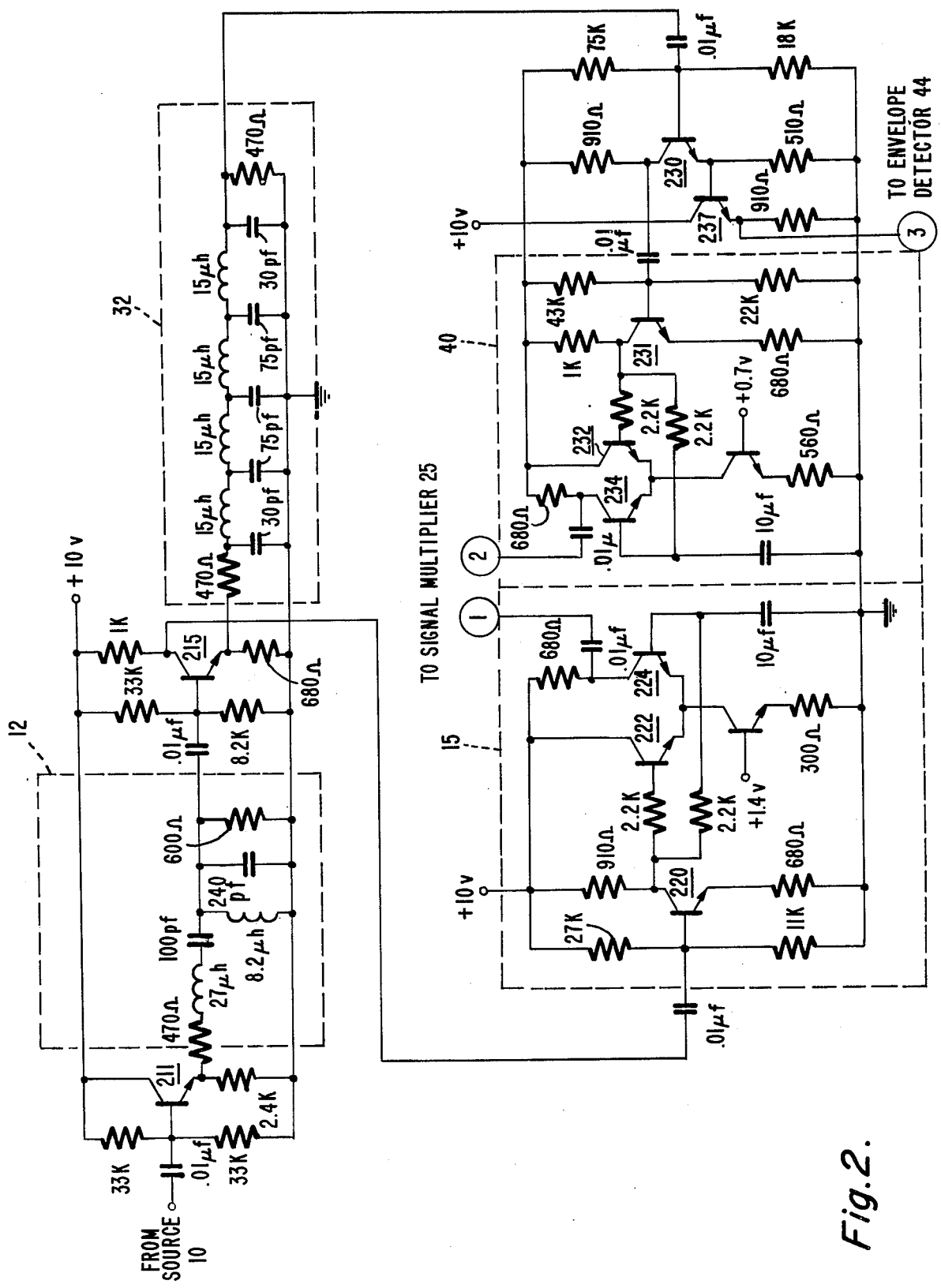

Reference is now made to the schematic circuit diagrams of FIGS. 2–5, which correspond to the portion of FIG. 1 enclosed within the dashed outline. In FIG. 2, video signals from source 10 are coupled via a buffer follower transistor 211 and resistance-inductance-capacitance chrominance bandpass filter 12 to a base input of an amplifier-buffer transistor 215. Amplified, filtered chrominance signals from the collector of transistor 215 are coupled to limiter 15, shown as comprising an amplifier transistor 220 and emitter coupled transistors 222, 224 arranged in differential amplifier configuration. Amplitude limited chrominance signals appear at a collector output of transistor 224 and at a terminal 1.

Chrominance signals are supplied at low impedance from an emitter of transistor 215 to delay unit 32, shown as comprising a series arrangement of inductance-capacitance delay sections. Delayed chrominance signals are coupled from unit 32 to limiter 40 via a collector output of an amplifier transistor 230. Limiter 40 comprises an amplifier transistor 231 and emitter coupled transistors 232, 234 arranged in differential amplifier configuration. Amplitude limited delayed chrominance signals appear at a collector output of transistor 234 and at a terminal 2. Delayed chrominance signals also appear at a terminal 3 via follower transistor 237.

Figure 3:
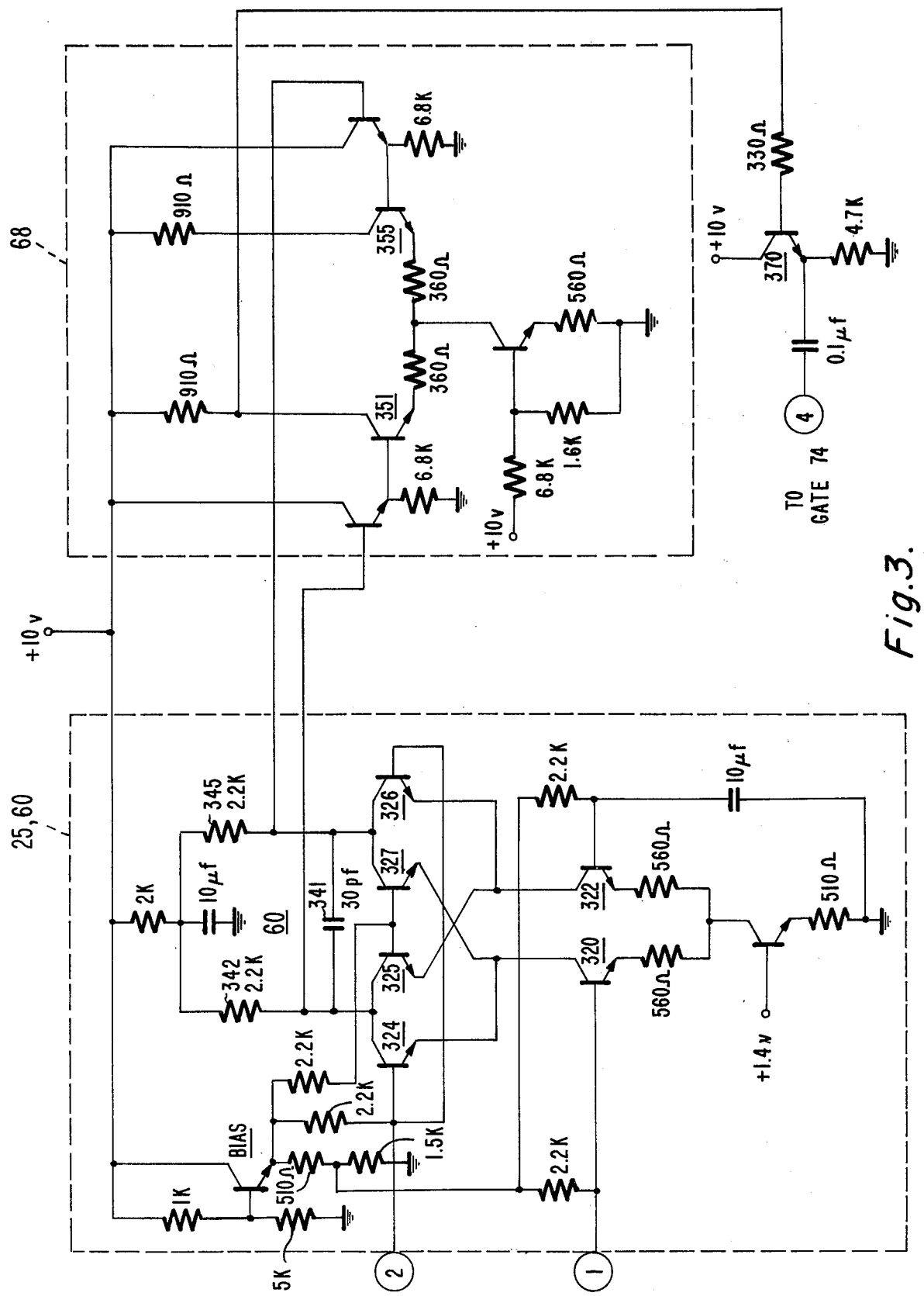

FIG. 3 illustrates respective circuit embodiments of signal multiplier 25, low-pass filter 60, and inverter 68. Amplitude limited undelayed and delayed chrominance signals appearing at terminals 1 and 2 are respectively applied as inputs to multiplier 25, comprising a first pair of lower rank, differentially connected transistors 320, 322, and second and third pairs of upper rank, differentially connected transistors 324–327. Specifically, undelayed chrominance signals from terminal 1 are coupled to a base input of transistor 320, and delayed chrominance signals from terminal 2 are coupled to base inputs of transistors 324 and 326. The output circuit of multiplier 25 includes a low pass filter 60 comprising collector load resistors 342, 345 and a capacitor 341 coupled between the joined collectors of transistors 324, 325 and 326, 327.

Output signals appearing at the joined collectors of transistors 324, 325 and 326, 327 are coupled to inputs of inverter 68, shown as comprising differentially arranged transistors 351, and 355. A relatively inverted signal (i.e., compared to the signal appearing at the joined collectors of transistors 324, 325 of multiplier 25) appears at the collector output of transistor 351, and is coupled via a follower transistor 370 and a terminal 4 to gate 74.

Figure 4:
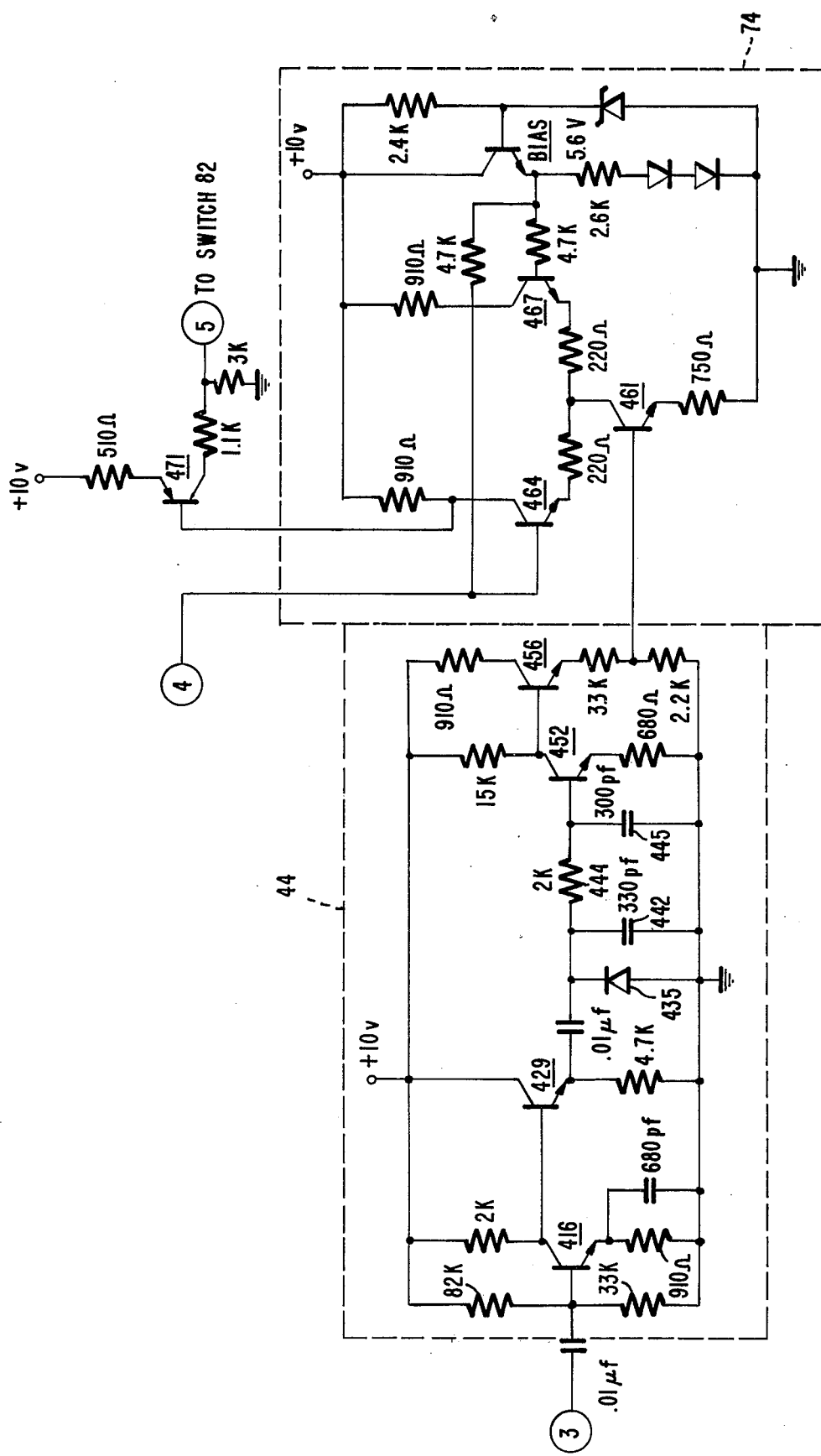

A circuit arrangement of gate 74 and envelope detector 44 is shown in FIG. 4. Delayed chrominance signals appearing at terminal 3 (see FIG. 2) are coupled via an amplifier transistor 416 and follower transistor 429 to an envelope detector network including a detector diode 435 and a low pass filter network comprising a resistor 444 and capacitors 442, 445. An envelope detected signal is coupled via transistors 452 and 456 to a base electrode of a transistor 461, comprising an input of AND gate 74.

Gate 74 comprises input transistor 461 together with emitter coupled transistors 464 and 467, arranged as shown. Input signals are applied to transistor 461 from envelope detector 44 and to a base input of transistor 464 from inverter 68 via terminal 4. Output signals produced at a collector of transistor 464 are applied to switch 82 via a buffer transistor 471 and a terminal 5. A suitable circuit arrangement of switch 82 is shown in FIG. 5.

In FIG. 5, the control signal from the output of gate 74 is coupled via terminal 5 and follower transistor 586 to a switching diode 588, which forms a part of switch 82 together with differential amplifier transistors 592, 593 and associated common base transistors 594, 595 arranged in the collector output circuits of transistors 592, 593. Video signals from source 10 are supplied to an input base electrode of transistor 593 and are transmitted via the collector-emitter path of transistor 595 to a collector output of transistor 595. A chrominance trap 87 comprising identical inductance-capacitance segments 87a and 87b is coupled to diode 588 and to transistors 592–595 as shown. Output signals from switch 82 are coupled from the collector of transistor 595 to luminance signal processing unit 100 via an amplifier-buffer stage 590 and chrominance trap 95.

Reference is made to the block diagram arrangement of FIG. 1 in connection with the following description of the operation of the invention, which likewise applies to the corresponding circuit arrangement encompassed by FIGS. 2–5.

The predetermined signal delay provided by delay 32 is chosen to define an interval within which a chrominance phase transition can occur. The delay of 140 nanoseconds chosen in this instance corresponds to one-half the period of the chrominance subcarrier signal (i.e, one-half the reciprocal of the 3.58 MHz subcarrier frequency), and represents a very small interval relative to the horizontal image line scanning interval of about sixty-three microseconds. Although this delay has been found suitable for purposes of determining the presence of an uncorrelated chrominance condition, other delays also can be used (e.g., odd or even multiplies of one-half of the chrominance subcarrier signal period) depending on the requirements of a particular system.

The speed at which phase transitions are expected to occur in a particular system should be taken into account in determining the amount of signal delay to be provided by delay 32. The delay should be short enough to define an interval during which a rapid phase transition can occur, in whole or in significant part, since rapid phase transitions are the cause of the interfering subcarrier sidebands as mentioned earlier. In the case of a color television signal processing system, a chrominance phase transition within an interval of five hundred nanoseconds approaches an upper limit of the speed at which such a transition can be expected to occur. A delay of 140 nanoseconds has been found suitable for determining the presence of rapid phase transitions of this order and less. It is noted that, with this delay, the output control signal from multiplier 25 will be significantly reduced in the presence of a very long duration phase transition (i.e., compared with 140 nanoseconds). However, the effectiveness of the system is not impaired in this instance because very long duration phase transitions generate few, if any, spurious subcarrier sideband components and are therefore of little concern.

On the other hand, the delay provided by unit 32 should not be excessively long with respect to the duration of expected phase transitions. An excessive delay is unsuitable for determining the presence of one or more rapid phase transitions since one or more of such transitions may be completed well within the delay interval. Consequently, multiplier 25 will not be supplied with delayed and undelayed chrominance signal inputs which accurately represent the existence of a rapid phase transition at a given point in time. In addition, such a delay may cause multiplier 25 to respond to longer duration phase transitions of the type which do not generate significant amounts of spurious subcarrier sideband components. Multiplier 25 would then provide an unnecessary and undesirable output control signal.

Signal multiplier 25 generates a negative-going output control signal when the phases of the delayed and undelayed input signals correspond to an uncorrelated phase condition during each horizontal line scanning interval. The magnitude of the output signal is proportional to the degree of chrominance phase dissimilarity, whereby a maximum positive output corresponds to a correlated condition and a less positive (i.e., negative-going) output corresponds to an uncorrelated condition.

The amplitude-versus-frequency response of the output provided by multiplier 25 is shown by waveform A in FIG. 6. In accordance with this waveform, a peak response occurs at the 3.58 MHz subcarrier frequency for a correlated signal condition, and a null occurs at one-half the subcarrier frequency for a maximum uncorrelated signal condition. The peak response at and in the region of zero hertz (D.C.) does not actually occur, since signal frequencies in this region are attenuated by chrominance bandpass frequency selection unit 12. A sharper response in the vicinity of the subcarrier frequency can be obtained when delay unit 32 provides a delay of 420 nanoseconds, or 3/2 times the subcarrier signal period. The response in this case is illustrated by waveform B of FIG. 6.

The output control signal generated by multiplier 25 in response to an uncorrelated signal condition contains high frequency harmonics of the 3.58 MHz subcarrier signal, as well as a relatively lower frequency component to be used for control purposes. The high frequency harmonics distort the control component and are therefore attenuated by low pass filter 60, which in this example exhibits a −3db bandwidth of from zero hertz (D.C.) to 1.2 MHz. The filtered control signal coupled from filter 60 is inverted by inverter 68 so that a corresponding positive-going control signal is produced and supplied to an input of gate 74.

The control signal from multiplier 25 can be produced in response to an uncorrelated condition caused by a chrominance phase transition, and also by (uncorrelated) high frequency luminance signals within the chrominance frequency band. It is therefore advantageous to provide an indication of which of these two signal conditions is present and responsible for the control signal generated by multiplier 25. This function is accomplished by the combination of envelope detector 44 and gate 74 together with multiplier 25 as follows.

A positive-going output signal from gate 74, representing an uncorrelated signal condition attributable to chrominance signal information, is generated when a positive signal above a given threshold level appears at one control input of gate 74 in response to the output signal from multiplier 25, in time coincidence with a positive signal from detector 44 also above the threshold level and coupled to the other control input of gate 74. High frequency luminance signals within the chrominance frequency band typically exhibit a relatively short duration and a non-periodic, or sporadic, repetition rate compared to chrominance signals. With regard to the circuit embodiment of envelope detector 44 shown in FIG. 4, diode 435 remains non-conductive and detector 44 does not provide a detected signal output above the threshold level if the duration of the high frequency luminance signals do not exceed the turn-on time of detector diode 435. Longer duration, non-periodic luminance signals sufficient to render diode 435 conductive nevertheless may be insufficient to cause a detected signal of sufficient magnitude to be developed by detector 44. This results since the time constant associated with filter elements 442, 444 and 445 of detector 44 does not permit a rapid response to the peak amplitude of the (luminance) signals processed by detector 44. This time constant is not critical, but should be sufficiently greater than the period of the chrominance subcarrier signal to permit envelope detection of the chrominance signals.

Accordingly, gate 74 does not receive a sufficient output signal from detector 44 in the presence of short duration, non-periodic luminance signals in the band of chrominance frequencies. However, chrominance signals are essentially periodic in nature and of longer duration compared to high frequency luminance signals. Therefore, envelope detector 44 provides a detected output signal above the threshold level in response to chrominance signals when of sufficient magnitude. The magnitude of the control signal from gate 74 is proportional to the magnitude of the output signal from multiplier 25 as generated in response to an uncorrelated chrominance phase condition. This control signal is utilized to control the operation of switch 82 such that trap 87 is coupled to signals processed by the luminance channel, as discussed below in connection with FIG. 5.

Diode 588 (FIG. 5) is non-conductive in the absence of a positive control signal at terminal 5 from gate 74, when an uncorrelated chrominance signal condition is not present. A positive control signal from gate 74 produced in response to an uncorrelated signal condition renders diode 588 conductive, thereby providing a conductive coupling path to ground for chrominance trap segments 87a and 87b. Interfering chrominance sideband frequencies appearing in the signal at the collector of transistor 593 and which are within the band rejection frequency range of trap 87a and therefore bypassed to ground (i.e., "trapped") via trap segment 87a and conductive diode 588, whereby the contaminating chrominance signals therefore do not appear at the collector output of transistor 595. This action essentially serves to modify the amplitude-versus-frequency response of the luminance channel by expanding the band rejection characteristic otherwise provided in the luminance channel by trap 95. This effect is illustrated by the frequency response curves of FIG. 7 (drawn to approximate scale).

Figure 7:
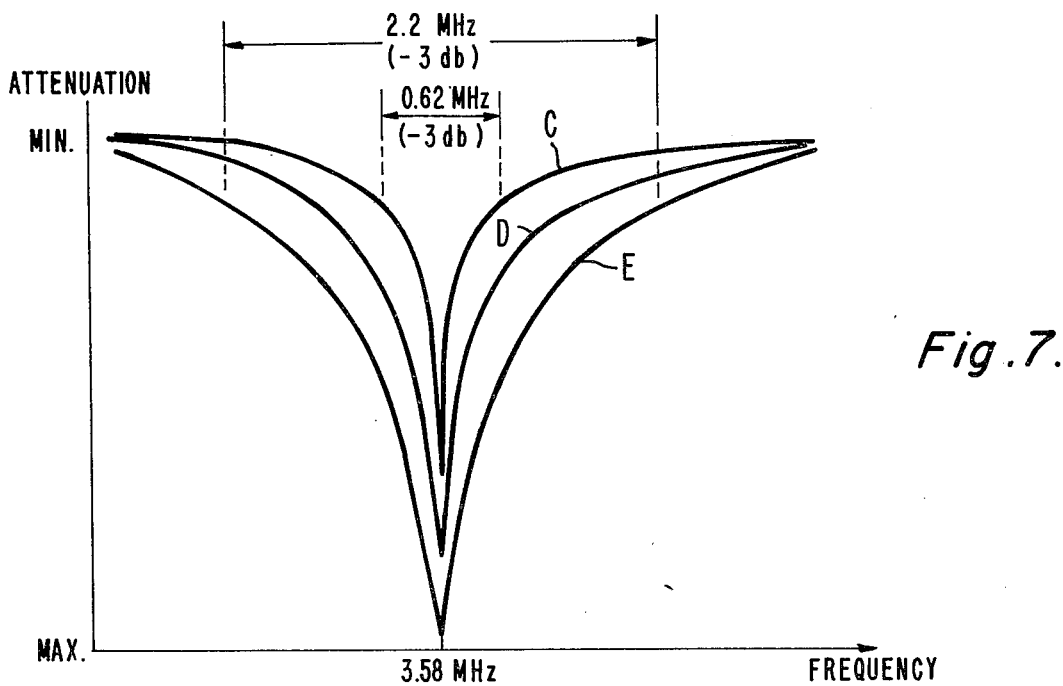

Curve C of FIG. 7 represents a chrominance signal rejection response which typically may be provided by trap 95 in the luminance channel of a color television receiver. In this instance trap 95 exhibits a −3 db bandwidth response of 0.62 MHz approximately centered about the 3.58 MHz chrominance subcarrier frequency, whereby signals within a frequency range of 3.58±0.31 MHz are attenuated 3 db or more. When trap 87 is coupled to the luminance channel in response to the control signal from gate 74, the chrominance signal rejection response of trap 87 (curve D) together with the response of trap 95 (curve C) combine to produce a composite chrominance signal rejection response as indicated by curve E. Signal frequencies within a wider bandwidth of 2.2 MHz, centered about 3.58 MHz, are then attenuated 3 db or more.

It is noted that the chrominance signal rejection bandwidth of trap 87 varies as a function of the magnitude of the output signal from multiplier 25 and the associated output signal from gate 74, which in turn are proportional to the amount of uncorrelated chrominance phase information. This effect is produced by the interaction of the reactive elements of trap 87 with the forward impedance exhibited by switching diode 588 when conducting in response to the control signal from gate 74.

Diode 588 presents a minimum impedance to ground when diode 588 exhibits maximum forward conduction in response to a control signal from gate 74 of maximum positive level. Trap 87 (e.g., trap segment 87a) then exhibits a maximum chrominance signal rejection bandwidth as indicated by curve D in FIG. 7. Accordingly, the composite chrominance signal rejection bandwidth of 2.2 MHz is produced (curve E in FIG. 7). This maximum signal rejection bandwidth is narrowed in proportion to the amount by which the magnitude of the control signal becomes less positive.

A less positive control signal causes diode 588 to conduct less, whereby diode 588 then exhibits increased forward impedance. The increased impedance of diode 588 in turn causes trap 87 to exhibit a narrower rejection bandwidth, with the effect of likewise narrowing the composite bandwidth rejection response provided by the combination of trap 95 and controlled trap 87. In this sense switching diode 588 also serves as an active impedance element of trap 87 for providing bandwidth control.

Thus, the variable conduction operation of diode 588 serves to narrow the maximum rejection bandwidth (curve E) from 2.2 MHz to between 2.2 MHz and 0.62 MHz, centered about the subcarrier frequency, when a less positive control signal indicates the presence of less uncorrelated chrominance phase information and fewer associated chrominance sideband components. The narrower chrominance signal rejection bandwidth therefore is sufficient to suppress the sideband components generated in this instance.

In sum, the disclosed apparatus serves to modify the frequency response of the luminance channel so that the wideband, subcarrier sideband components associated with an uncorrelated chrominance phase condition are attenuated in the luminance channel. Consequently, the interfering edge dots associated with the uncorrelated condition and otherwise visible in a displayed image are suppressed or eliminated, thereby improving the quality of a reproduced image.

The arrangement described herein can be employed alone or in combination with the apparatus disclosed in my copending, concurrently filed U.S. patent application Ser. No. 859,863 entitled "Suppression Of Luminance Signal Contamination Of Chrominance Signals In A Video Signal Processing System," assigned to the present assignee. Such apparatus also serves to improve the quality of a reproduced color image by reducing or eliminating objectionable "cross-color" effects which are otherwise visible in a reproduced image when high frequency luminance components occur within the passband of the chrominance component.

While the invention has been described in terms of a preferred embodiment, it should be recognized that various modifications can be made by persons skilled in the art without departing from the scope of the invention. Component values and other examples of operating parameters have been mentioned as an aid to understanding the invention and are not intended to be limiting.

It is noted that the embodiment of the invention shown in FIGS. 1 and 2–5 operates to sense and compensate for uncorrelated phase information, which is considered to be the primary cause of visible edge dot interference. However, the illustrated embodiment also can be arranged to sense uncorrelated amplitude information. This can be accomplished by eliminating amplitude limiters 15 and 40, and coupling the undelayed signal from frequency selection unit 12 and the delayed signal from delay unit 32 directly to the respective inputs of multiplier 25. In this case the output control signal of multiplier 25 will be representative of both uncorrelated amplitude and phase information.

The output control signal from multiplier 25 may be employed to control the operation of switch 82 directly, without the use of envelope detector 44 and gate 74. Also, other means may be employed in response to the multiplier output signal along or in conjunction with the output signal from gate 74 for suppressing the interfering edge dots. Illustratively, the luminance channel could be gain controlled or inhibited to reduce the impact of uncorrelated chrominance components on a displayed image, or the bandwidth selectively of the chrominance signal trap (e.g., trap 95) which is often included in the luminance channel of a color television receiver could be varied electronically for the same purpose. Apparatus for electronically varying the bandwidth of the luminance channel can be of the type disclosed in U.S. Pat. No. 3,924,266 of L. A. Harwood.

Delay unit 32 can comprise any suitable means for developing an appropriate signal delay, such as charge transfer devices.

What is claimed is:

1. In a color television signal processing system for controlling the luminance and chrominance of a reproduced color image in response to image representative luminance and chrominance components of successive image line intervals of said color television signal, wherein said chrominance component comprises modulated color subcarrier waves exhibiting a parameter subject to transitions occurring within said line intervals, with rapid ones of said transitions being associated with the presence of subcarrier sideband components which may effect an undesirable disturbance of said reproduced color image if permitted to significantly affect the luminance thereof; apparatus comprising:
  frequency selective means responsive to said color television signal for passing signal frequencies of said chrominance component;
  means for delaying signals passed by said frequency selective means a predetermined amount significantly less than said line interval;
  detector means responsive to the input of said signal delaying means and to the output of said signal delaying means for providing an output signal substantially exclusive of said chrominance component and indicative of the occurrence of one of said rapid parameter transitions; and
  utilization means responsive to said output signal for preventing said associated subcarrier sideband components from significantly affecting the luminance of said reproduced color image.

2. Apparatus according to claim 1, wherein: said parameter is the phase of said chrominance component.

3. Apparatus according to claim 2, wherein: said delay means provides a signal delay equal to an odd half multiple of the period of said chrominance component.

4. In a color television signal processing system for controlling the luminance and chrominance of a reproduced color image in response to image representative luminance and chrominance components of said color television signal, wherein said chrominance component comprises modulated color subcarrier waves exhibiting a phase subject to transitions, with particular ones of said transitions being associated with the presence of subcarrier sideband components which may effect an undesirable disturbance of said reproduced color image if permitted to significantly affect the luminance thereof; apparatus comprising:
  frequency selective means responsive to said color television signal for passing signals confined to a band of frequencies occupied by said chrominance component;
  means for delaying signals passed by said frequency selective means a predetermined amount corresponding to an interval during which one of said phase transitions can occur;
  signal multiplier means responsive to the input of said signal delaying means and to the output of said signal delaying means for detecting the relative phases of said chrominance component and said delayed chrominance component, to provide an output signal indicative of the occurrence of one of said phase transitions; and
  utilization means responsive to said output signal for preventing said associated subcarrier sideband components from significantly affecting the luminance of said reproduced color image.

5. Apparatus according to claim 4 and further comprising:
  means for limiting the amplitude of said chrominance component and said delayed chrominance component coupled to said signal multiplier means.

6. In a color television signal processing system for controlling the luminance and chrominance of a reproduced color image in response to image representative luminance and chrominance components of said color television signal, wherein said chrominance component comprises modulated color subcarrier waves exhibiting a phase subject to transitions, with particular ones of said transitions being associated with the presence of subcarrier sideband components which may effect an undersirable disturbance of said reproduced color image if permitted to significantly affect the luminance thereof; apparatus comprising:
  frequency selective means responsive to said color television signal for passing signals confined to a band of frequencies occupied by said chrominance component;
  means for delaying signals passed by said frequency selective means a predetermined amount corresponding to an interval during which one of said phase transitions can occur;

detector means responsive to the input of said signal delaying means and to the output of said signal delaying means for providing an output signal indicative of the occurrence of one of said particular phase transitions;

means for sensing the amplitude of said video signals, for providing an output signal indicating the presence of said chrominance component;

means responsive to said output signal from said sensing means and to said output signal from said detector means, for providing a control signal indicative of the presence of said particular ones of said phase transitions when said output signals from said sensing means and from said detector means coincide;

utilization means responsive to an input control signal for preventing said associated subcarrier sideband components from significantly affecting the luminance of said reproduced color image; and means for coupling said control signal to said input of said utilization means for controlling said luminance signal to suppress said sideband signals.

7. Apparatus according to claim 6, wherein:
said sensing means detects the amplitude envelope of said delayed chrominance component.

8. Apparatus according to claim 6, wherein:
the magnitude of said control signal is proportional to the magnitude of said output signal from said detector means.

9. In a color television signal processing system for controlling the luminance and chrominance of a reproduced color image in response to image representative luminance and chrominance components of said color television signal, said processing system including a luminance channel for translating selected portions of said color television signal for use in controlling the luminance of said reproduced color image, wherein said chrominance component comprises modulated color subcarrier waves exhibiting a phase subject to transitions, with rapid ones of said phase transitions being associated with the presence of subcarrier sideband components which may effect an undesirable disturbance of said reproduced color image if permitted to significantly affect the luminance thereof; apparatus comprising:

first frequency selective means responsive to said color television signal for passing signal frequencies of said chrominance component;

means for delaying signals passed by said first frequency selective means a predetermined amount less than the duration of the most rapid ones of said phase transitions;

detector means responsive to the input of said signal delaying means and to the output of said signal delaying means for providing an output signal substantially exclusive of said chrominance component and indicative of the occurrence of one of said rapid phase transitions; and means for coupling said output signal to said luminance channel for modifying the amplitude versus frequency response of said luminance channel in such manner that said associated subcarrier sideband components are prevented from significantly affecting the luminance of said reproduced color image during such phase transition occurrence.

10. In a color television signal processing system for controlling the luminance and chrominance of a reproduced color image in response to image representative luminance and chrominance components of said color television signal, said processing system including a luminance channel for translating selected portions of said color television signal for use in controlling the luminance of said reproduced color image, wherein said chrominance component comprises modulated color subcarrier waves exhibiting a phase subject to transitions, with particular ones of said phase transitions being associated with the presence of subcarrier sideband components which may effect an undesirable disturbance of said reproduced color image if permitted to significantly affect the luminance thereof; apparatus comprising:

first frequency selective means responsive to said color television signal for passing signals confined to a band of frequencies occupied by said chrominance component;

means for delaying signals passed by said first frequency selective means a predetermined amount corresponding to an interval during which one of said particular phase transitions can occur;

detector means responsive to the input of said signal delaying means and to the output of said signal delaying means for providing an output signal indicative of the occurrence of one of said particular phase transitions;

second frequency selective means; and switch means coupled to said second frequency selective means and responsive to said output signal from said detector means, for coupling said second frequency selective means to said luminance channel to modify the amplitude versus frequency response of said luminance channel to suppress said sideband signals in said luminance channel, whereby said subcarrier sideband components are prevented from significantly affecting the luminance of said reproduced color image during such phase transition occurrence.

11. Apparatus according to claim 10, wherein:
said switch means includes an active controllable conduction device for controlling the operation of said second frequency selective means such that said sideband signals are suppressed within a range of frequencies in accordance with the magnitude of said detector output signal.

12. Apparatus according to claim 11, wherein:
said active device comprises a semiconductor device with a dynamic forward impedance when rendered conductive in response to said detector output signal.

13. In a color television signal processing system for controlling the luminance and chrominance of a reproduced color image in response to image representative luminance and chrominance components of said color television signal, said processing system including a luminance channel for translating selected portions of said color television signal for use in controlling the luminance of said reproduced color image, wherein said chrominance component comprises modulated color subcarrier waves exhibiting a phase subject to transitions, with particular ones of said phase transitions being associated with the presence of subcarrier sideband components which may effect an undesirable disturbance of said reproduced color image if permitted to significantly affect the luminance thereof; apparatus comprising:

first frequency selective means responsive to said color television signal for passing signals confined to a band of frequencies occupied by said chrominance component;

means for delaying signals passed by said first frequency selective means a predetermined amount corresponding to an interval during which one of said particular phase transitions can occur;

detector means responsive to the input of said signal delaying means and to the output of said signal delaying means for providing an output signal indicative of the occurrence of one of said particular phase transitions;

second frequency selective means included in said luminance channel for attenuating a first range of chrominance signal frequencies;

third frequency selective means for attenuating chrominance signal frequencies within a greater frequency range relative to said first range; and switch means for coupling said third frequency selective means to said luminance channel in response to said detector output signal, for modifying the amplitude versus frequency response of said luminance channel in such manner that said associated subcarrier sideband components are prevented from significantly affecting the luminance of said reproduced color image during such phase transition occurrence.

14. In a color television signal processing system for controlling the luminance and chrominance of a reproduced color image in response to image representative luminance and chrominance components of said color television signal, said processing system including a luminance channel for translating selected portions of said color television signal for use in controlling the luminance of said reproduced color image, wherein said chrominance component comprises modulated color subcarrier waves exhibiting a phase subject to transitions, with particular ones of said phase transitions being associated with the presence of subcarrier sideband components which may effect an undesirable disturbance of said reproduced color image if permitted to significantly affect the luminance thereof; apparatus comprising:

first frequency selective means responsive to said color television signal for passing signals confined to a band of frequencies occupied by said chrominance component;

means for delaying signals passed by said first frequency selective means a predetermined amount corresponding to an interval during which one of said particular phase transitions can occur;

signal multiplier means responsive to the input of said signal delaying means and to the output of said signal delaying means for providing an output signal indicative of the occurrence of one of said particular phase transitions; and means for coupling said output signal to said luminance channel for modifying the amplitude versus frequency response of said luminance channel in such manner that said associated subcarrier sideband components are prevented from significantly affecting the luminance of said reproduced color image during such phase transition occurrence.

15. In a color television receiver responsive to an image representative color television signal inclusive of respective luminance and chrominance components; said receiver including a luminance channel for translating signals for use in controlling the luminance of a reproduced color image, said luminance channel including frequency selective signal attenuation means for normally effecting significant attenuation of components of said color television signal having frequencies falling within a given range of frequencies; said color television receiver also including a chrominance channel for translating signals for use in controlling the chrominance of said reproduced color image, said chrominance channel including frequency selective means for confining the signals translated by said chrominance channel to a band of frequencies occupied by said chrominance component, said chrominance component comprising modulated color subcarrier waves having a phase subject to transitions, with particular ones of said transitions being associated with the presence of subcarrier sideband components of frequencies lying outside said given range; apparatus comprising:

means for delaying signals passed by said frequency selective means a predetermined amount corresponding to an interval during which one of said particular transitions can occur;

detector means responsive to the input of said signal delaying means and to the output of said signal delaying means for providing an output signal indicative of the occurrence of one of said particular phase transitions; and utilization means responsive to said output signal for modifying the amplitude versus frequency response of said signal attenuating means in such manner that said associated subcarrier sideband components are substantially suppressed during such phase transition occurrence.

16. Apparatus according to claim 15, wherein:

said delaying means delays said chrominance component by an amount substantially equal to one-half the reciprocal of the frequency of said chrominance component.

* * * * *